(12) United States Patent
Johnson

(10) Patent No.: US 10,894,710 B1
(45) Date of Patent: Jan. 19, 2021

(54) TRANSPORTABLE SERVICE STATION

(71) Applicant: Garrett Tyler Johnson, Virginia Beach, VA (US)

(72) Inventor: Garrett Tyler Johnson, Virginia Beach, VA (US)

(73) Assignee: Garrett T. Johnson, Virginia Beach, VA (US)

( * ) Notice: Subject to any disclaimer, the term of this patent is extended or adjusted under 35 U.S.C. 154(b) by 0 days.

(21) Appl. No.: 16/166,970

(22) Filed: Oct. 22, 2018

Related U.S. Application Data

(60) Provisional application No. 62/574,950, filed on Oct. 20, 2017.

(51) Int. Cl.
*B60P 3/22* (2006.01)
*B67D 7/04* (2010.01)
*B63B 35/28* (2006.01)
*B63B 35/44* (2006.01)
*B63B 21/50* (2006.01)
*H01Q 1/10* (2006.01)
*H01Q 1/24* (2006.01)
*H01Q 1/12* (2006.01)
(Continued)

(52) U.S. Cl.
CPC .............. *B67D 7/04* (2013.01); *B60F 3/0061* (2013.01); *B60P 3/2205* (2013.01); *B63B 21/50* (2013.01); *B63B 35/28* (2013.01); *B63B 35/44* (2013.01); *H01Q 1/10* (2013.01); *H01Q 1/1242* (2013.01); *H01Q 1/241* (2013.01); *H01Q 1/34* (2013.01); *B60F 2301/00* (2013.01); *B63B 2035/4426* (2013.01)

(58) Field of Classification Search
CPC .......... B67D 7/04; H01Q 1/10; H01Q 1/1242; H01Q 1/241; H01Q 1/34; B63B 35/28; B63B 2035/4426; B60P 1/43; B60P 3/0257; B60P 3/14; B60P 3/2245; B60P 3/225; B60P 3/2265; B60P 3/2205; B60F 3/0061; B60F 2301/00
See application file for complete search history.

(56) References Cited

U.S. PATENT DOCUMENTS 5,971,039 A * 10/1999 Webb ...................... B63B 35/00
114/256
2008/0047481 A1* 2/2008 Maarschalkerweerd ....................
B60F 3/0092
114/344
(Continued)

*Primary Examiner* — Craig M Schneider
*Assistant Examiner* — Jason K Niesz
(74) *Attorney, Agent, or Firm* — Williams Mullen; F. Michael Sajovec; Douglas C. Tsao

(57) ABSTRACT

The present disclosure relates to a service station that is transportable over a predetermined roadway or by water. The service station has a base having a stern, bow, and two lateral sides. The base is configured to displace a volume of water so as to render the service station buoyant. A tank is disposed on the base and is configured to contain fuel. The tank is configured to comply with U.S. Government requirements for transportation of fuel over roadways. A pump is disposed on the base, and is configured to dispense liquid fuel to supply vehicles. An axle assembly is coupled to the base and has at least one wheel, the at least one wheel and axle assembly moveable between an engaged position and a stored position. The least one wheel is in contact with a surface and partially supports the base over the surface in an engaged position.

20 Claims, 6 Drawing Sheets

(51) Int. Cl.
*H01Q 1/34* (2006.01)
*B60F 3/00* (2006.01)

(56) References Cited

U.S. PATENT DOCUMENTS

2011/0316299 A1* 12/2011 Mccoubrey ............... B60P 3/14
 296/24.32
2019/0274289 A1* 9/2019 Leow ...................... B63B 21/50

* cited by examiner

TRANSPORTABLE SERVICE STATION

CROSS REFERENCE TO RELATED APPLICATIONS

This application claims the benefit of U.S. Provisional Application No. 62/574,950, filed Oct. 20, 2017, the contents of which are incorporated by reference in its entirety.

STATEMENT REGARDING GOVERNMENT SUPPORT

None.

FIELD

This disclosure relates to an apparatus for the staging of supplies and/or equipment to provide services to those involved in an evacuation, in particular by use of a transportable service station as disclosed.

BACKGROUND

Governments may issue notices of mandatory or optional evacuations to their citizens for a variety of reasons. For example, a prediction of imminent, hazardous weather, such as hurricane or typhoon landfall may merit the evacuation of people from the affected geographic regions. Coastal regions and other low lying areas may be particularly vulnerable to flooding. In 2017, Hurricane Irma followed the destructive Hurricane Harvey, which had previously caused widespread flooding in the Houston, Tex. area and over 80 deaths. With the prospect of landfall of a Category 4 hurricane, Government officials in Florida required evacuation of many vulnerable areas.

Hundreds of thousands of Floridians were reported to have evacuated. The mass evacuation led to severe traffic congestion and widespread fuel shortages. Many vehicles and people were stranded while evacuating, often due to running out of fuel needed to continue their evacuation.

Of course, other circumstances may justify large scale evacuation, such as civil disturbances, loss of supporting utilities, public health threats, etc.

It would be desirable to provide a means, apparatus, or vehicle for enabling the positioning of a source of fuel and other services along evacuation routes. Further, it would be desirable if such an item would be suitable or capable of surviving environmental conditions like those seen in Texas and Florida before, during, and after hurricane landfall. At the same time, such an apparatus should be stable, inexpensive, and mobile. Preferably, such a device would also be capable of being adapted for transportation on land and/or water, and scalable to respond to a variety of environments.

BRIEF SUMMARY OF THE INVENTION

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

Disclosed herein is a transportable service station that is capable of being transported to and temporarily staged or positioned at a service location in an evacuation zone or along an evacuation route. The service station is adapted to provide fuel and other services to evacuating vehicles.

In one embodiment, a service station transportable over a predetermined roadway or by water is provided. The service station has a base having a stern, bow, and two lateral sides. The base is configured to displace a volume of water so as to render the service station buoyant in water. The base has a length over an x-axis, a height over a y-axis, and a beam width over a z-axis. The service station also has a tank disposed on the base, the tank defining a tank interior configured to contain a liquid fuel having at least a flammability rating of 2 under the U.S. Government Hazardous Materials Identification Standards. The tank is further configured to comply with U.S. Government requirements for transportation of such liquid fuel over the predetermined roadway. A pump is disposed on the base and is in fluid communication with at least a portion of the interior of the tank accessible to the liquid fuel. The pump is configured to dispense the liquid fuel to supply one or more types of vehicles. An axle assembly is coupled to the base and has at least one wheel. The at least one wheel and axle assembly are moveable between an engaged position and a stored position. When the axle assembly and wheel are positioned in the engaged position, the wheel is in contact with a surface of the roadway and partially supports the base over the surface so that the base may be transported over the predetermined roadway using the at least one wheel. When positioned in the stored position the base may be rested on the surface.

In another embodiment, a service station is configured to be transportable over a predetermined roadway or by water. The service station has an amphibious base having a top surface, a hull, two lateral sides, a front face, a rear face, and a hollow interior. A pump is disposed on the base and is in fluid communication with at least a portion of the interior of the tank accessible to the liquid fuel. The pump is configured to dispense the liquid fuel to supply one or more types of vehicles. A tank is disposed on the base. The tank defines a tank interior configured to contain a liquid fuel having at least a flammability rating of 2 under the U.S. Government Hazardous Materials Identification Standards. The tank is further configured to comply with U.S. Government requirements for transportation of such liquid fuel over the predetermined roadway. A fill pipe is configured for refilling the tank, and the fill pipe is designed and constructed to minimize the risk of fuel spillage during fueling operations and when the tank is involved in a crash. The base is configured to displace a volume of water so as to render the service station buoyant in waterways or flooded areas.

In yet another embodiment, an amphibious service station is configured to be transported over waterways or roadways. The service station has a base configured for use on land and water, wherein the base is buoyant. A pump is disposed on the base and is in fluid communication with at least a portion of the interior of the tank accessible to the liquid fuel. The pump is configured to dispense the liquid fuel to supply one or more types of vehicles. A tank is disposed on the base. The tank defines a tank interior configured to contain a liquid fuel having at least a flammability rating of 2 under the U.S. Government Hazardous Materials Identification Standards. The tank further is configured to comply with U.S. Government requirements for transportation of such liquid fuel over the predetermined roadway. The service station also has an anchor. An axle assembly is coupled to the base and has at least one wheel. The wheel and axle assembly are moveable between an engaged position and a stored position, such that when positioned in the engaged position the at least one wheel is in contact with a surface and partially supports the base over the surface so that the base may be transported over the predetermined roadway using the at least one wheel. When positioned in the stored position the base may be rested on the surface.

BRIEF DESCRIPTION OF THE DRAWINGS

Illustrative embodiments of the present disclosure are described in detail below with reference to the attached drawing figures and wherein.

DESCRIPTION

Figure 1:
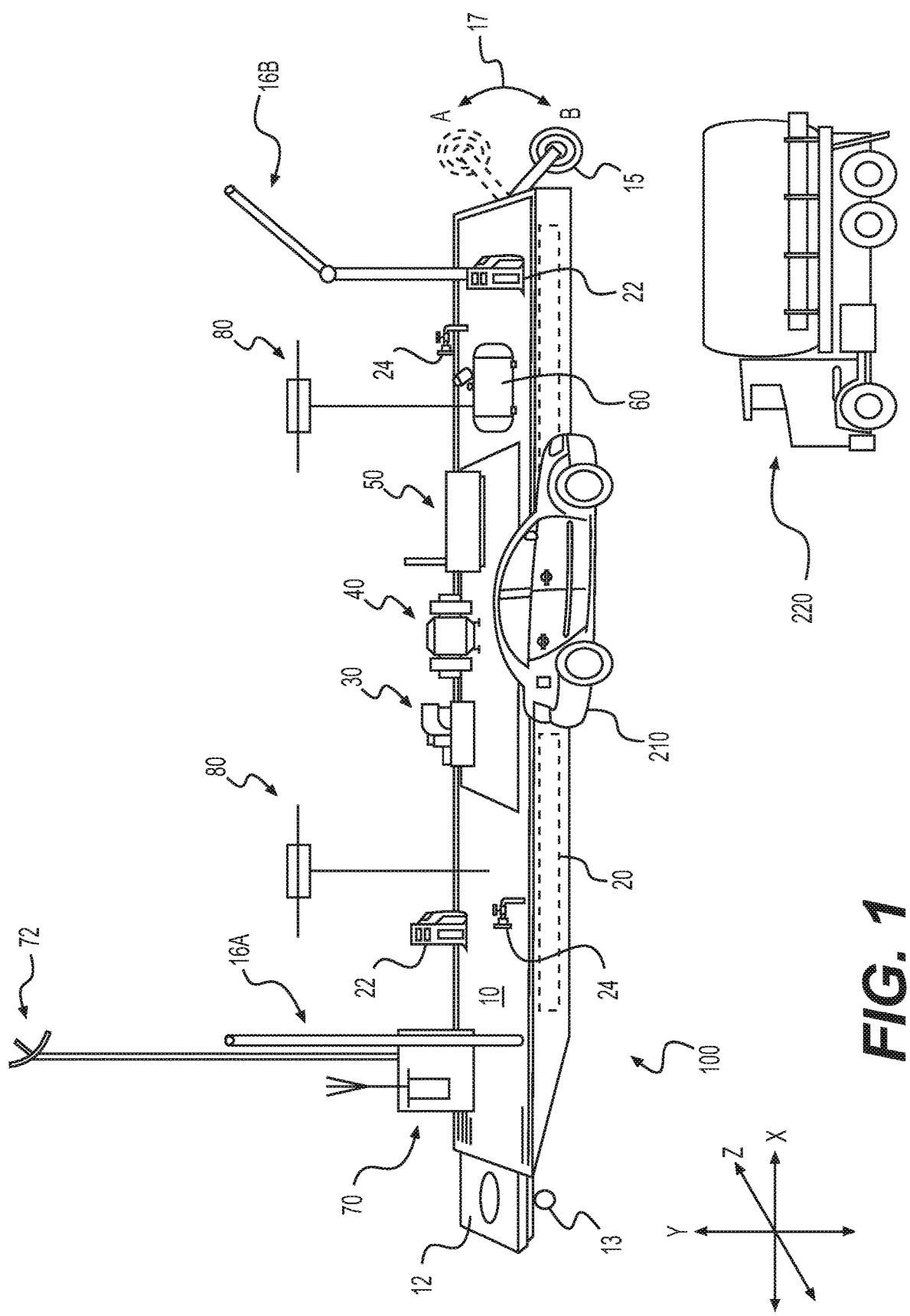
FIG. 1 is a perspective view of an embodiment of a service station.

The present invention now will be described more fully in reference to the accompanying figures, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

As used herein, the term "comprising" or "comprises" is open-ended, and includes one or more stated features, integers, elements, steps, components or functions but does not preclude the presence or addition of one or more other features, integers, elements, steps, components, functions or groups thereof. As used herein, the term "and/or" includes any and all combinations of one or more of the associated listed items. The term "about" means the stated value plus or minus a reasonable or conventional margin of error of measurement, or plus or minus 10% if no method of measurement is indicated.

As used herein, the common abbreviation "e.g.," which derives from the Latin phrase "exempli gratia," may be used to introduce or specify a general example or examples of a previously mentioned item, and is not intended to be limiting of such item. If used herein, the common abbreviation "i.e.," which derives from the Latin phrase "id est," may be used to specify a particular item from a more general recitation.

The terminology used herein is for the purpose of describing particular embodiments only and is not intended to be limiting of the invention. As used herein, the singular forms "a," "an" and "the" are intended to include the plural forms as well, unless the context clearly indicates otherwise.

Well-known functions or constructions may not be described in detail for brevity and/or clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, spatially relative terms, such as "under," "below," "lower," "over," "upper," "downward," "upward," "inward, "outward" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

It will be understood that when an element is referred to as being "attached," "coupled" or "connected" to another element, it can be directly attached, coupled or connected to the other element or intervening elements may also be present. In contrast, when an element is referred to as being "directly attached," directly coupled" or "directly connected" to another element, there are no intervening elements present. Words such as passageway, fluid path, or flow component, etc., are intended to communicate structure supporting fluid communication and may comprise a tube, pipe, hose, boring, channel, etc.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

The present invention is directed to a transportable service station 100, which may be transported to and temporarily staged or positioned at a service location within an evacuation zone, or more particularly, along an evacuation route. The service station 100 is adapted to provide fuel and other desired services to evacuating vehicles 210. Examples of evacuating vehicles 210, in this context, may include motor vehicles such as automobiles, busses, and trucks, as well as boats within a flooded area or along a desired waterway. In many cases, it would be desirable to be able to deliver a service station to a service location by a road vehicle, such as a tractor trailer. The service station 100 may comprise a base 10, a tank 20, at least one wheel, and at least one pump.

Figure 2:
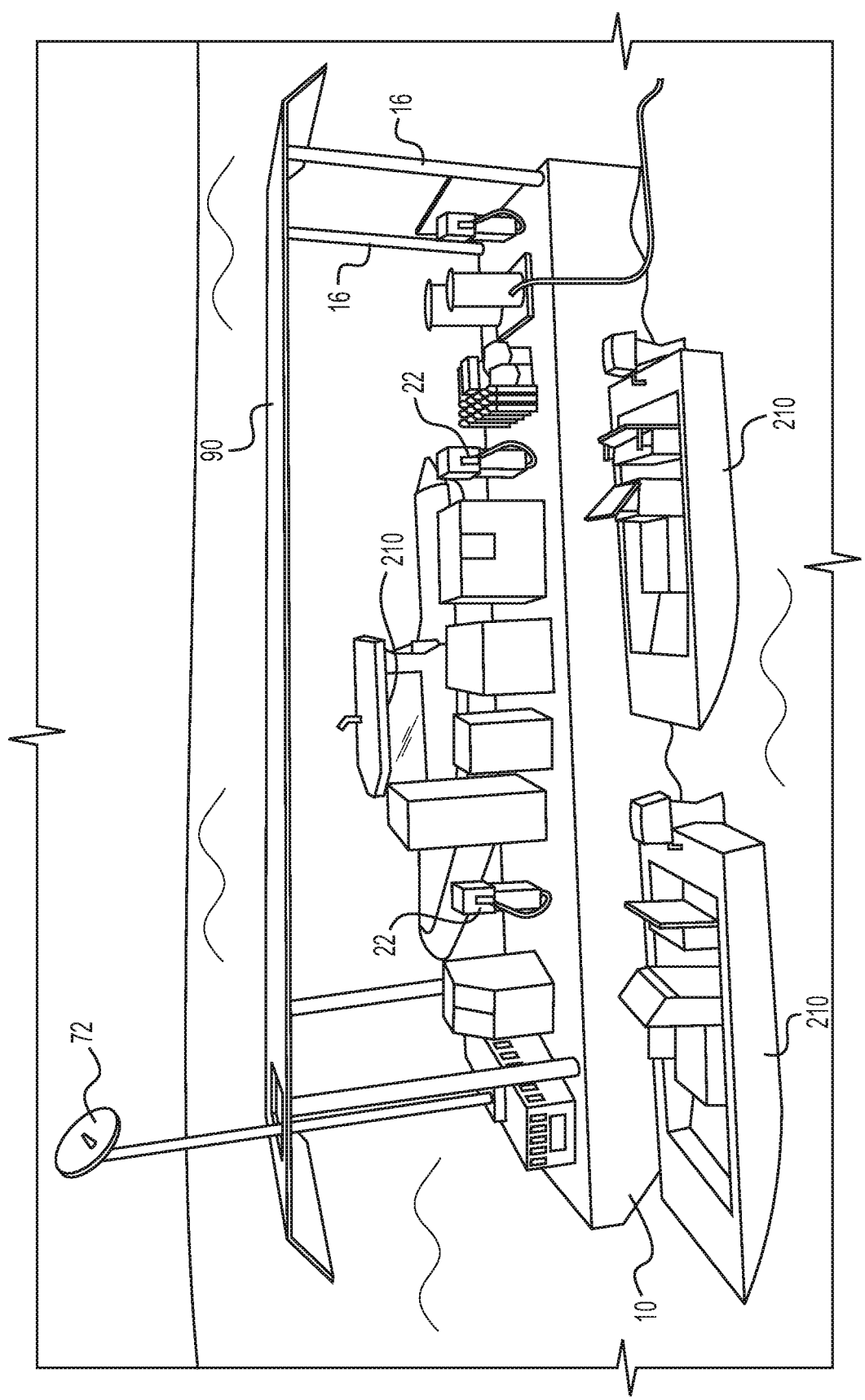
FIG. 2 is a perspective view of an embodiment of a service station as it is staged in a marine environment.
Figure 3:
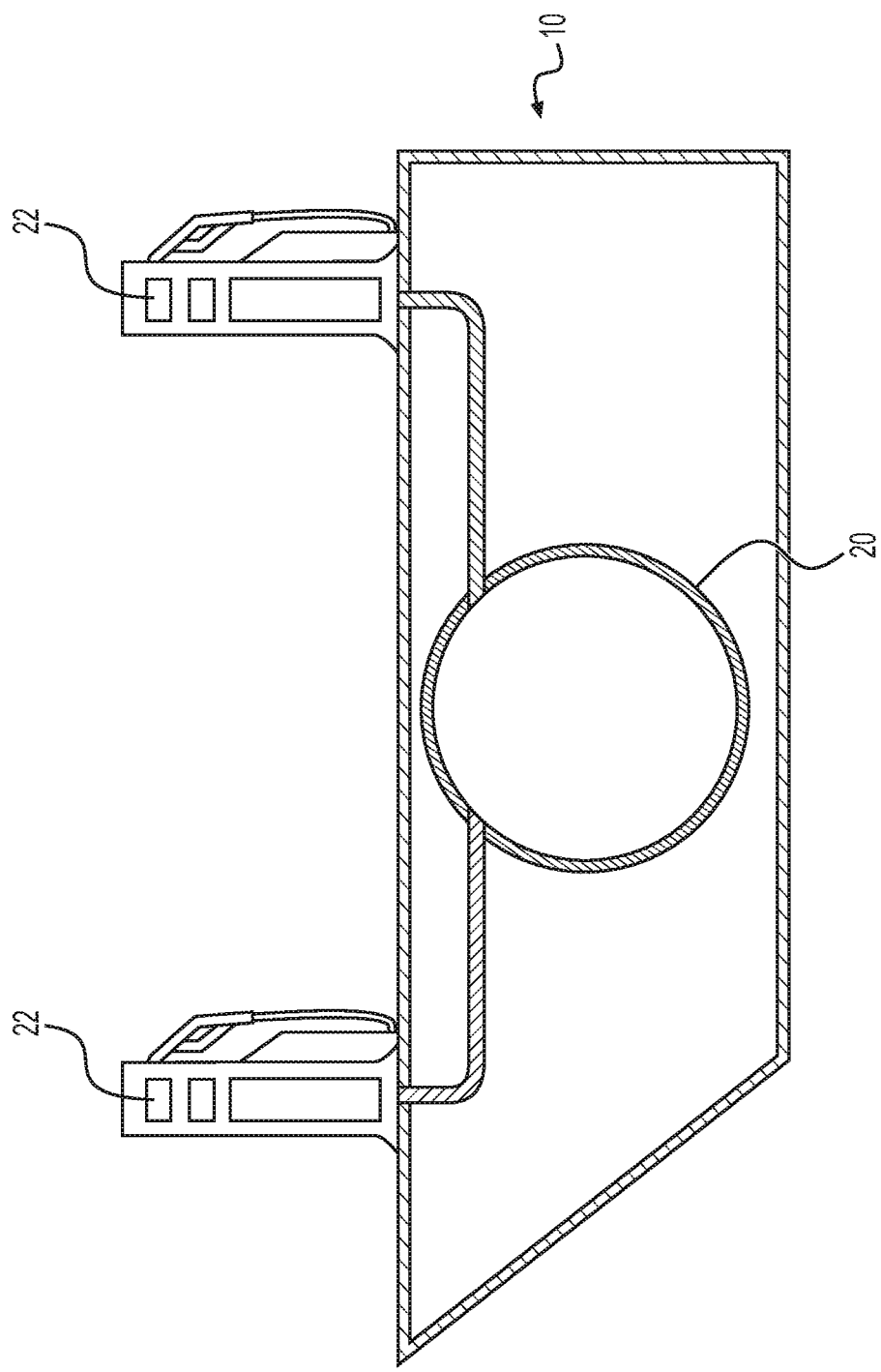
FIG. 3 is a cross section view of an embodiment of a service station.

Referring to FIG. 1, the service station 100 may take a variety of embodiments. In one form, the service station 100 has a base 10 that may be in the form of an amphibious barge suitable for transportation both on water or over land. As shown in FIG. 2, the service station 100 may be used in a marine location. The base 10 may have a top surface, a hull, two lateral sides, a front face at the edge of a bow of the base, and a back face at the edge of a stern of the base. The base 10 may be substantially hollow having an interior cavity. In some embodiments, and as is shown in FIG. 3, the interior cavity may contain at least one tank 20. Alternately, the tank 20 may be coupled below the base 10. The base 10 may have a length over an x-axis, a height over a y-axis, and a beam width over a z-axis.

The base 10 may be made of steel, aluminum, iron, metal alloys, and any other appropriate material now known or later discovered. The base 10 may have one or more bulkheads. In some embodiments, the base may have at least two bulkheads, one proximate each the front face and another proximate the back face. Alternately, there may be a bulkhead separating the at least one tank 20 from additional tanks.

The hull may be a displacement hull. Alternately, the hull may have a substantially flat surface. In some embodiments, the base 10 has a double hull. The double hull may aid in displacing a sufficient amount of water to keep the base afloat. Further, the double hull may provide increased stability when the base 10 is afloat. In the event of a leak or if an outer hull is punctured, an inner hull may not be breached, and the base may remain afloat.

The base may have a length over an x-axis, a height over a y-axis, and a beam width over a z-axis. The base 10 may have a length between 30 feet and 65 feet, and a width between 8 feet and 14 feet. The base 10 may have a height that is less than 14 feet. In some embodiments, the base may have a height of at least three feet. In additional embodiments, the height of the base is between three feet and six feet. The height of the base 10 in addition to all other items coupled, mounted to, or disposed on the base may not exceed a height of 14 feet while the base 10 is being transferred.

The base 10 may have a sufficient buoyancy wherein the displacement exceeds the weight of the service station 100 when fully loaded. The buoyancy may be calculated as follows:

$$F_{buoyant} = \rho V_f g$$

Alternately, the tank 20 may have capacity requirements in order to maintain buoyancy in marine environments. The tank 20 may have a fill restriction of, for example, 60% capacity in marine environments.

Figure 4:
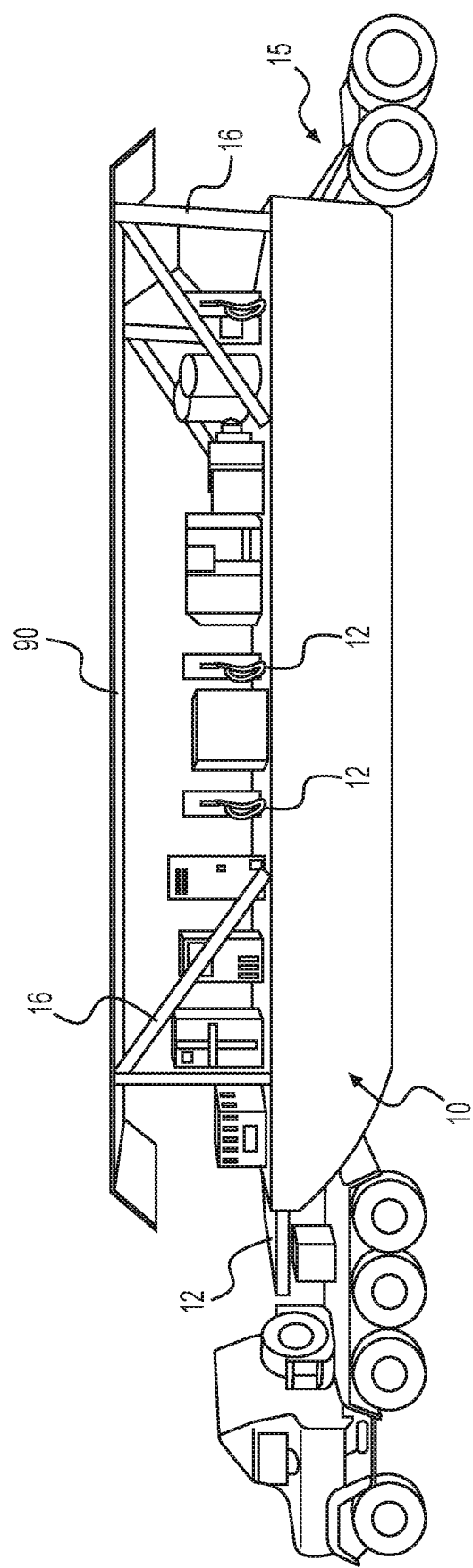
FIG. 4 is a side view of an embodiment of a service station as it is being transported.

There may be an axle assembly 15 mounted proximate a rear face of the base 10. The axle assembly 15 may be coupled to at least one wheel. In some embodiments, the axle assembly 15 is pivotally mounted to the base. The wheel may be variable between a stored position "A" and an engaged position "B". In the engaged position "B", the wheel may be configured to interact with the roadway to assist with the transportation of the service station 100, as is shown in FIG. 4. This may eliminate the need for a trailer when transporting the service station 100.

Preferably, stored position "A" would decrease the freeboard needed for access to the base 10. In stored position "A", the wheel may be vertically above the ground's surface. Alternately, in stored position "A", at least a portion of the wheel may be above a lateral plane of the top surface of the base. In other embodiments, the entire wheel may be above the base. In some embodiments, the axle assembly 15 may be coupled proximate a top of the rear face of the base, and in stored position "A" the wheels may rest on the top surface of the base. In some embodiments, there may be four wheels coupled to the axle assembly 15. Alternately, a single wheel may be used. When the axle assembly 15 is positioned in the stored position "A" the base 10 may be rested on the surface of the roadway. The axle assembly 15 may be coupled to the base at the stern and proximate a rear face of the base 10. The axle assembly 15 may further be situated substantially parallel to the z-axis of the base 10, and further configured to pivot around the x-axis of the base 10 while vertically moving in the y-axis.

The axle assembly 15 may be hydraulically powered. While the axle assembly 15 is variable between a stored position "A" and an engaged position "B", the axle assembly 15 could have many intermediate positions between the stored position "A" and the engaged position "B". Alternately, the axle assembly 15 could be gear actuated between the stored position "A" and the engaged position "B". The axle assembly 15 could further be manually actuated and secured into each position with a pin. Alternately, the axle assembly 15 could be actuated using a winch. The axle assembly 15 may also have a notched partial cam that maintains an intermediate position. The axle assembly 15 may have a preference for normal of engaged position "B". Thus, in the event of a malfunction, the wheel would return to engaged position "B".

The base 10 may be appropriately sized so as to be transportable over dry land. In some embodiments, the base 10 may be transported by towing, as with a tractor trailer. Transportation over water may also be made by towing, as with a tug or other water vehicle. Alternately, the service station 100 may be self-motivated, using systems such as a drive train, engine, wheels, etc. The service station 100 may be self-motivated on both land and water. In some embodiments, there may be a steering function proximate the stern of the base.

The service station 100 may be configured so that land-based transportation may be over a desired portion of an interstate highway system. The service station 100 may comply with various Department of Transportation guidelines regarding size limitations for the service station 100. The government-imposed size limitations are a crucial aspect of the present invention in order for the service station 100 and base 10 to be transported over land.

In the event an evacuation is being planned, one or more service stations 100 may thus be positioned at service locations along primary evacuation routes along an interstate, for example. Service roads may provide ready access to interstate highways. Land based transportation may be enabled by variable position rear axle assembly 15 and a separate, towing tractor, as is shown in FIG. 4. The axle assembly 15 may be a pivotally mounted or adjustable axle assembly 15 mounted to a rear of base 10, which, as shown by arrow 17, may be moved from a stored position "A" to a transport position "B." Preferably, stored position "A" would decrease the freeboard needed for access to the base 10. At the opposing end of base 10 is forward assembly 12; as shown, forward assembly 12 may include fitting 13 for mating or engagement with a desired motive machine or road vehicle, such as a tractor or truck having a fifth wheel assembly. In one embodiment, the service station 100 may have a hitch that is configured to be coupled to a trailer, semi-truck, towing tractor, or other means of land transportation. In marine based transportation, base 10 may simply include bitts, chocks, bollards, or windlass assemblies by which base 10 may be towed by a tug or lighter to a marine location. Of course, some embodiments may feature elements permitting both modes of transportation for desired flexibility.

It is contemplated that base 10 may be adapted to float should a service location become flooded. Thus, the base 10 may be amphibious and the service station 100 may be capable of being used on water or on land. Therefore, the base 10 may comprise a barge that is a road transportable size. The base 10 may have an anchor in order to secure the base in flooded areas or on waterways. In some embodiments, the anchor comprises spud legs 16. The spud legs 16 may be configured to act as an anchor in flooded areas or on waterways. Alternately, the base 10 may be in the form of a jack up barge. Spud legs 16 may be in the form of vertical structural elements, piles, pipes, pilings, or threaded columns, suitable for fixing the position of the barge in a service location, while also permitting the barge to float freely with changes in water level should the service location become flooded. Spud legs 16 may be used in both land service areas, service areas on waterways, and land service areas that are expected to be flooded. The spud legs 16 may allow the base 10 to float freely in areas as they become flooded and the water levels rise. In some embodiments, the service station 100 may be staged on the ground in a service area that is expected to be flooded. As the water level rises, the spud legs 16 may allow the base to freely float as opposed to being submerged during water level increases.

Spud legs 16 may be operated manually or with a crane, or may include drive machinery, such as a motorized pinion gear with a rack mounted on each of spud leg 16, for example. Alternatively, spud legs 16 may be threaded to be gear driven or hydraulically telescoping. In some embodiments, the spud legs 16 may be between 8 and 20 feet in length. In some embodiments, as shown with spud leg 16B in FIG. 1, the spud legs may be articulated with one or more joints or hinges so as to be foldable in order to reduce in height during road transportation. Of course, water borne transportation may not require shortening, as illustrated with spud leg 16A. Spud legs 16 may also, alternatively, be telescoping with locking assemblies when service station 100 is positioned in a service location, optionally operated by hydraulic rams. Alternately, the telescoping spud legs 16 may be manually actuated. In another embodiment, the spud legs 16 may be retractable. The spud legs 16 may be retractable through the top surface and hull of the base.

One example of base 10 may be provided by a jack up barge having a length of about 12.2 meters (40'), beam of about 10 meters (32.8'), and a depth of about 1.2 meters (3.9'). Such an embodiment may commonly provide around 22 tons of capacity for a deck load, for example. Other dimensions may be appropriate, depending on the application. However, applications intended to be delivered by interstate highway should satisfy appropriate, governmental size requirement; for example, in one embodiment, the length is about equal to or less than about fifty-three feet (53').

If the service station 100 is transported over the water, the moorings of the service station 100 may be sufficiently strong to hold during all expected conditions of surge, current, and weather, and may be long enough to allow adjustment for changes in draft, drift, and tide when fuel is being transferred. Transfer hoses may be long enough to allow the vessel to move to the limits of its moorings without placing strain on the hose, loading arm, or transfer piping system. Each hose may be supported to prevent kinking or other damage to the hose.

In one embodiment, one or more fuel tanks 20 are found within the interior of base 10 or mounted on a surface deck, and the one or more fuel tanks 20 are in operable fluid communication with fuel pumps 22 to form a fuel delivery system. The tank 20 may be securely attached to the base in a workmanlike manner. Pumps 22 may be gear pumps, siphons, fuel dispensers, suction pumps, etc. Additionally, the tank 20 may have a submersible pump. The pumps 22 may have nozzle spouts that have an outside diameter of the terminal end not greater than 0.840 inches, a terminal end having a straight section of at least 2.5 inches, and a retaining spring terminating at least three inches from the terminal end. Alternately, pumps 22 may have a nozzle spout having a terminal end having an outside diameter of 0.884 inches. The nozzle spout may also include an aspirator hole for automatic shutoff positioned with a center that is approximately 0.67 inches from the terminal end of the spout. The terminal end may have a straight section of at least 2.5 inches with no holes or grooves other than the aspirator hole. The nozzle may further include a retaining spring that terminates at least three inches from the terminal end.

Tanks 20 may include pressure relief valves, vapor emission recovery systems, internal baffles, ballasting systems, as well as installed fire suppression systems, depending on the requirements of the application. Internal baffles may be offset, and lower portions of tanks 20 may be shaped for positive drainage. In some surface mount embodiments, tanks 20 may be tank containers. A tank container built to ISO standards may be suitable for different modes of transportation. It is contemplated that embodiments transportable on roads will be compliant with Department of Transportation and Environmental Protection Agency requirements for the fuel of concern. In the event of marine embodiments, tanks 20 may be located low within base 10 to assist in ballasting or lowering the center of gravity. In some embodiments, the tank 20 may be situated along a central x-axis of the base 10. This may allow for increased stability and ballasting.

The tanks 20 thus define a tank interior configured to contain a liquid fuel having at least a flammability rating of 2 under the U.S. Government Hazardous Materials Identification Standards. "At least" in this context may refer to ratings greater than flammability rating 2, such as a flammability rating of 3, intended to include liquid fuels such as diesel and gasoline, for example. While those liquid fuels are contemplated as desirable for most applications, other fuels may be needed depending on the application. The tank further is configured to comply with U.S. Government requirements for transportation of such liquid fuel over the predetermined roadway. Tanks 20 may comply with all U.S. Government regulations for transportation of liquid fuel over a roadway or waterway, and appropriate marking of hazardous materials. Specifically, the tank 20 may comply with 49 CFR § 172.101 Purpose and use of hazardous materials table, and all referenced sections therein; 49 CFR § 173.24 General requirements for packagings and packages; 49 CFR § 393.67 Liquid fuel tanks; and 49 CFR § 393.65 All fuel systems, as well as other regulations and requirements.

Joints of the tank 20 may be closed by arc-, gas-, seam-, or spot-welding by brazing, silver soldering, or by techniques which provide heat resistance and mechanical securement. Joints may not be closed solely by crimping or soldering with a soft solder. Threads of all fittings of the tank 20 may be Dryseal American Standard Taper Pipe Thread or Dryseal SAE Short Taper Pipe Thread. Alternately, straight threads may be used on fittings having integral flanges and using gaskets for sealing. At least four threads may be engaged in each fitting.

The tank 20 may have drains or other bottom fittings that do not extend more than three-fourths of an inch below the lowest part of the fuel tank or pump. The fittings through which fuel is withdrawn may be located above the normal level of fuel in the tank 20 when the tank 20 is full.

The tank 20 may have a venting system which, in the event the tank is subjected to fire, will prevent internal tank pressure from rupturing the body, seams, or any bottom openings of the tank 20. The tank 20 and fittings may be capable of withstanding an internal hydrostatic pressure equal to 150 percent of the maximum internal pressure reached in the tank during a safety venting test. The tank 20 may also be equipped with a nonspill air vent. The air vent may be combined with a fill-pipe cap or a safety vent, or it may be a separate unit. Alternately, the air vent may be a ball check valve. Ball check valves may be maintenance free and flow efficient.

The tank 20 may have a capacity of up to 11,600 gallons. Alternately, the tank 20 may have a capacity of 400 gallons. In one embodiment, the tank 20 is a cylindrical tank. In another embodiment, the tank 20 has an oval shape.

Preferably, the tank 20 should not be filled to more than 95 percent of its liquid capacity to allow for normal expansion of the fuel. The tank 20 may also be plainly marked with a warning against filling it to more than 95 percent of its liquid capacity, and the liquid capacity may also be plainly marked. This may prevent fuel spillage. The tank 20 may be legibly and permanently marked as to the month and year of manufacture, the manufacturer's name on tanks 20 manufactured after Jul. 1, 1989, a means of identifying the facility at which the tank 20 was manufactured, and a certificate that it conforms to the federal rules pertaining to liquid fuel tanks.

The tank 20 may be configured to transport liquid fuel per all regulations required by the U.S. Government. The tank 20 may be configured to transport liquid fuel that has a hazard class of 2 or higher. Specifically, the tank 20 may be configured to transport flammable gasses and flammable and combustible liquid. Additionally, the tank 20 may be configured to transport liquids that assigned a Packing Group II degree of danger presented by the material transported. In some embodiments, the tank 20 or base 10 is appropriately marked to indicate that the fuel is a flammable liquid. Additionally, the tank 20 may be configured to store materials such that the fuel may be stowed on deck or under deck of a cargo vessel and on a passenger vessel carrying a number of passengers limited to not more than the larger of 25 passengers or one passenger per ever three meters of overall vessel length.

In some embodiments, the design of tanks 20 may be a vessel of stainless steel surrounded by an insulating and protecting layer, such as a layer of polyurethane and aluminum. The tanks 20 and vessel may be situated within a steel frame, if needed, to form a tank container. The frame may be within standard container sizing to meet ISO standards, as desired. It is contemplated that some embodiments may include removable tanks through replacement tank containers. Tank container capacities may vary, but preferably they would be selected to accommodate the transportation mode(s), contemplated demand, the configuration of base 10, etc. In some cases, one or more sources of other fuels may be provided, as shown with tank 60 for propane, which may be used to supply generator 50 or other demands. Alternatively, diesel, marine grade fuel, or propane may be offered as additional services from service station 100.

Figure 5:
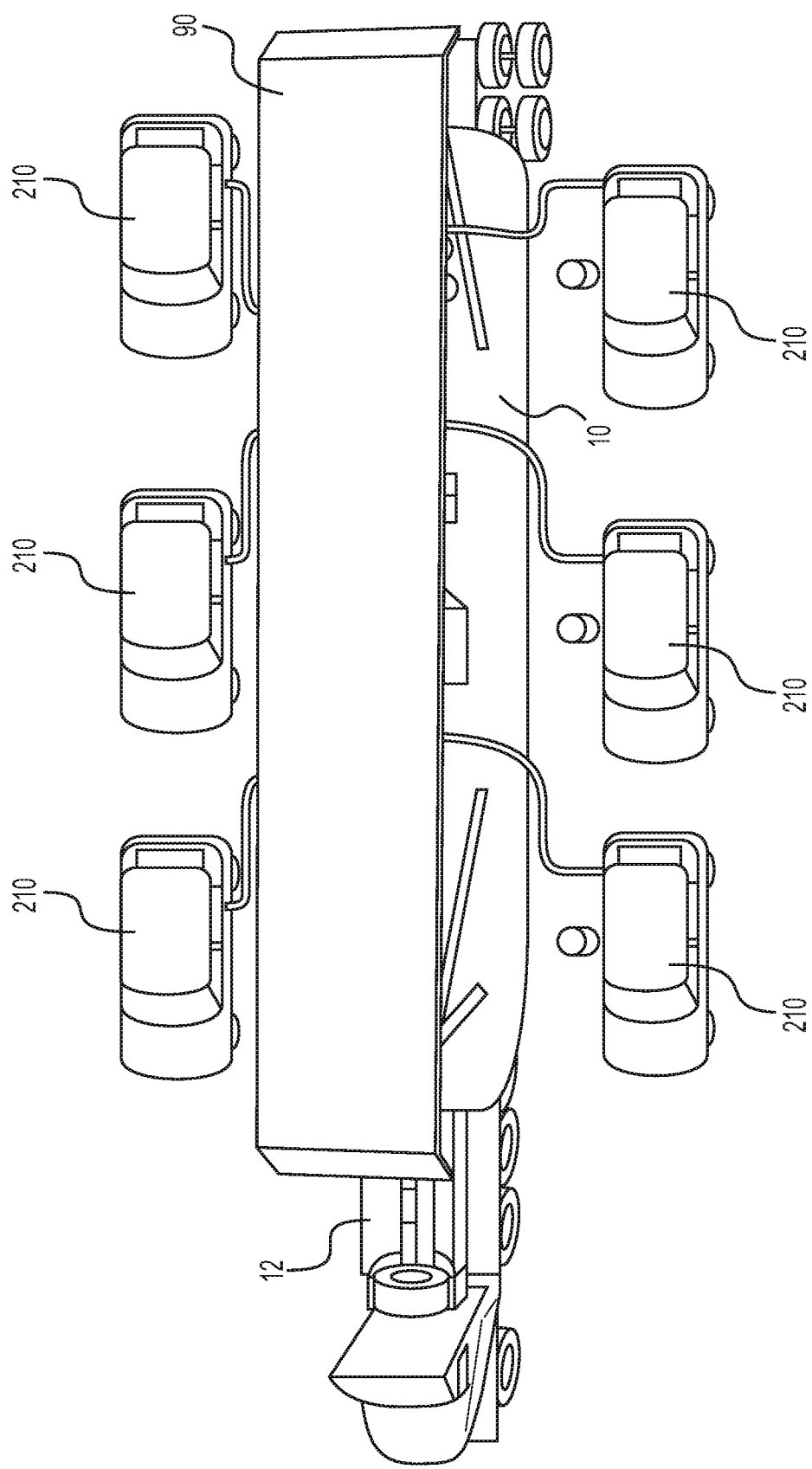
FIG. 5 is a top view of an embodiment of a service station as it is staged.
Figure 6:
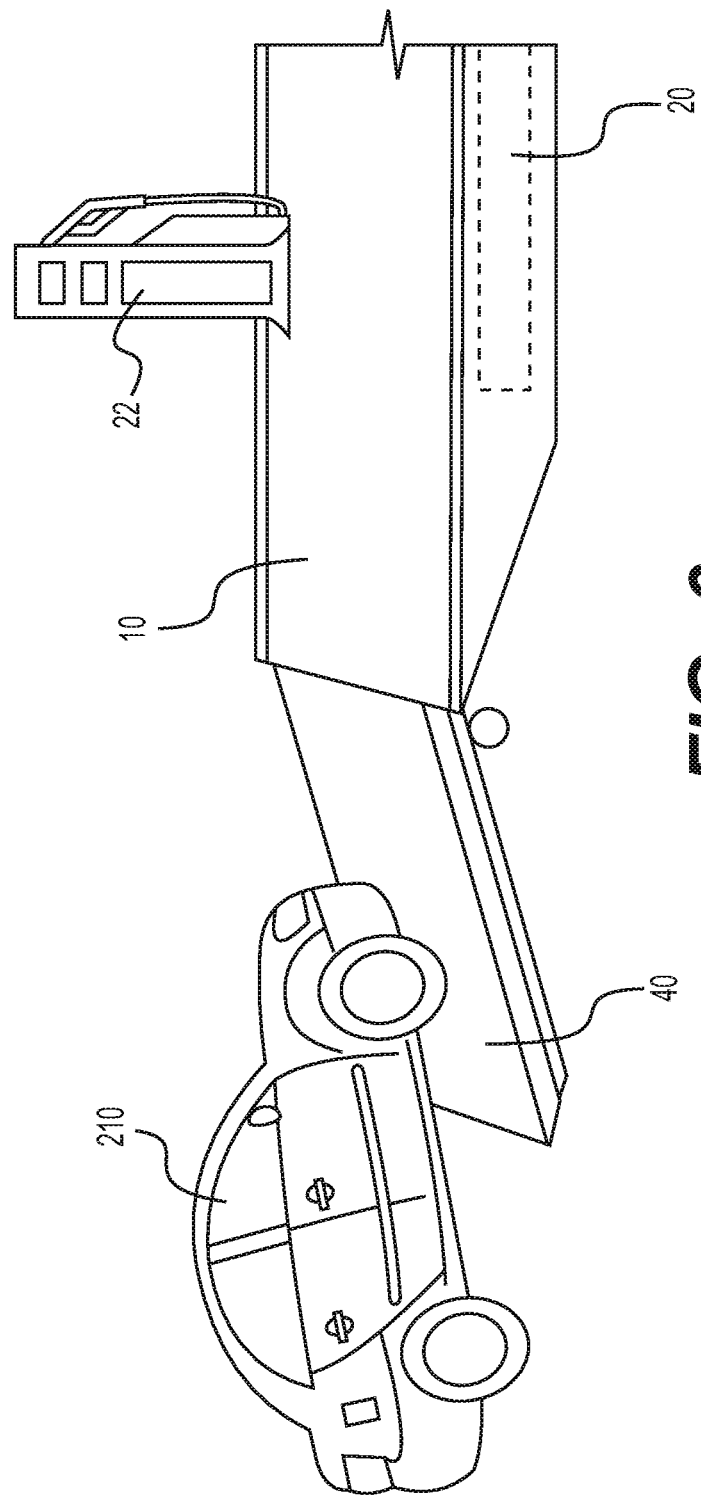
FIG. 6 is an exploded view of a base of a service station in one embodiment having a ramp.

Such an arrangement may be configured to serve motor vehicles 210, in which case pumps 22 may be selected from self-service models or other design suited for the application, as is shown in FIG. 5. In some applications, temporary ramps 40 may be positioned adjacent to fuel pumps 22, if needed due to freeboard of base 10, as is shown in FIG. 6. Alternatively, the ramps 40 may be coupled to the base 10, and variable between an engaged position and a stored position. Ramps 40 may have a grade of up to 30 percent. In some embodiments, ramps 40 may be used so that pumps 22 can extend to vehicles 210 adjacent base 10. In other embodiments, ramps 40 may be used so that vehicles 210 may board base 10. In some instances, ramps 40 have a grade of 12 percent.

A power supply may be provided. In some embodiments, the power supply is a generator 50. Alternately, the power supply could be another power source, such as solar panels and batteries. The power supply may provide any electricity required by pumps 22, as well as any additional power needs of supporting infrastructure within a fuel delivery system, such as a vacuum supply pump, for example.

Fuel tanks 20 may also be in fluid communication with one or more fill pipes 24, adapted or configured for use with desired means for refilling transportation of fuel, such as tanker truck 220. Each fill pipe 24 may be designed and constructed to minimize the risk of fuel spillage during fueling operations and when the vehicle is involved in a crash. For example, fill pipe 24 may include multiple valves in series, devices such as drop tubes or automatic shutoff valves (e.g., by magnetic coupled actuator), gooseneck pipe configurations, overfill protection devices, containment structures, etc. In some cases, fill pipes 24 will be configured as in gasoline stations, so as to be operable with conventional gasoline tanker trucks 220, for example. In other cases, marine fittings may be desired. Fill pipes 24 may terminate with a cam and groove coupling for petroleum applications. This is a two-piece assembly in which a cam engages with a gasket to form a liquid-tight seal. It is also contemplated that some designs may be pressurized by gravity feed from supplying tanker trucks; for example, a tanker truck may be positioned on an overpass or other elevated vicinity, providing a desired head.

When in transport, the tank 20 may not have a fuel line that is connected from the service station 100 to the vehicle that is towing the service station 100 while both are in motion. The tank 20 may have minimal fuel in transport. After the service station 100 is staged, fuel may then be loaded into the tank 20. Alternately, the tank 20 may be fully loaded as it travels to a service area.

If the service station 100 is self-motivated, there may be a separate tank used to move the service station 100. The tank 20 may have minimal fuel in transport in this embodiment as well. Upon staging, the tank 2 may be fully loaded with fuel.

Supporting infrastructure may include a variety of elements for additional services, some of which may permit expanded operations or services. As shown in FIG. 1, for example, lighting 80 may be provided for service availability and use in darkness. Additionally, the service station 100 may have a roof 90 that may keep equipment 30 sheltered from inclement weather. Equipment 30 may include items such as a water service device, desalinator, filtration device, distillation system, air compressors, hydraulic system, refrigeration (e.g., for food or liquid supplies), ice maker, power transformer, power rectifier, generator, an ATM machine, a water boiler, a digital billboard, an oxygenator, etc. There may be a separate tank that may be used to power the equipment 30. A communication system 70 may be included, which optionally may include satellite communications as symbolized by dish 72. Alternately, there may be both a satellite communication center as well as a traditional communications center. The satellite with the satellite communication center 70 may be a telescoping mast satellite antenna. Alternately, the communication system 70 could include a cellular antenna. Further, the service station 100 may include a bathroom.

In some embodiments, multiple service stations 100 may be provided. Each service station 100 may be coupled to one another in order to service more vehicles 210. In some embodiments, the service stations 100 may be coupled to one another proximate the base 10. A first service station 100 may be coupled to a second service station 100 proximate the bases 10. In some embodiments, the rear face of the base 10 of a first service station 100 may be coupled proximate the front face of the base 10 of a second service station 100.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A service station transportable over a predetermined roadway or by water, the service station comprising:
    a base having a stern, bow, and two lateral sides, the base configured to displace a volume of water so as to render the service station buoyant in water, the base having a length over an x-axis, a height over a y-axis, and a beam width over a z-axis;
    a tank disposed on the base and defining a tank interior configured to contain a liquid fuel having at least a flammability rating of 2 under the U.S. Government Hazardous Materials Identification Standards, the tank further configured to comply with U.S. Government requirements for transportation of such liquid fuel over the predetermined roadway;
    a pump disposed on the base, the pump in fluid communication with at least a portion of the interior of the tank accessible to the liquid fuel, and configured to dispense the liquid fuel to supply one or more types of vehicles; and
    an axle assembly coupled to the base proximate the stern and having at least one wheel, the at least one wheel and axle assembly moveable between an engaged position and a stored position, such that when positioned in the engaged position the at least one wheel is adapted to be in contact with a surface of a roadway and partially support the base over the surface so that the base may be transported over the predetermined roadway using the at least one wheel, and when positioned in the stored position the base may be rested on the surface.

2. The service station of claim 1, wherein the service station is amphibious and further comprises at least one bulkhead.

3. The service station of claim 2, wherein the base of the service station is a barge.

4. The service station of claim 1, wherein the length of the base is less than or equal to 65 feet, and the width of the base is less than or equal to 14 feet.

5. The service station of claim 4, wherein the length of the base is greater than or equal to 30 feet, and the width of the base is greater than eight feet.

6. The service station of claim 1, wherein the axle assembly is coupled to the base proximate a rear face of the base, the axle assembly further being situated substantially parallel to the z-axis of the base, and further configured to pivot around the x-axis of the base while vertically moving in the y-axis.

7. The service station of claim 6, wherein in a stored position, at least a portion of the at least one wheel is vertically above and not in contact with the surface of a roadway.

8. The service station of claim 1, further comprising a telescoping mast satellite antenna configured to be used with a communications center.

9. The service station of claim 1, wherein at least two service stations provided, and the service stations are adapted to be coupled to one another.

10. The service station of claim 2, further comprising an anchor.

11. The service station of claim 10, wherein the anchor is at least one spud leg, wherein the spud leg permits the base to float in the event of rising water levels.

12. The service station of claim 1, wherein the service station is self-motivated.

13. A service station configured to be transportable over a predetermined roadway or by water, the service station comprising:
    an amphibious base having a top surface, a hull, two lateral sides, a front face, a rear face, and a hollow interior;
    a tank disposed on the base, and, defining a tank interior configured to contain a liquid fuel having at least a flammability rating of 2 under the U.S. Government Hazardous Materials Identification Standards, the tank further configured to comply with U.S. Government requirements for transportation of such liquid fuel over a roadway;
    a pump disposed on the base in fluid communication with at least a portion of the interior of the tank accessible to the liquid fuel and configured to dispense the liquid fuel to supply one or more types of vehicles;
    a fill pipe configured for refilling the tank, the fill pipe designed and constructed to minimize risk of fuel spillage during fueling operations and when the tank is involved in a crash; and
    wherein the base is configured to displace a volume of water so as to render the service station buoyant in water.

14. The service station of claim 6, wherein the at least one wheel and axle assembly are moveable between an engaged position and a stored position, wherein in the stored position at least a portion of the wheel may be above a lateral plane of the top surface of the base.

15. The service station of claim 13, further comprising:
    a power supply; and
    a communications device selected from either a telescoping mast satellite antenna or a cellular antenna.

16. The service station of claim 15, wherein the power supply is a generator, and further comprising a water service device, the water service device selected from the group consisting of a water boiler, an oxygenator, an ice maker, and a water desalination device.

17. The service station of claim 13, further comprising spud legs configured to be used as an anchor if the base were to be used in flooded areas or on waterways.

18. An amphibious service station configured to be transported over waterways or roadways, the service station comprising:

a base configured for use on land and water, wherein the base is buoyant;

a tank disposed on the base, and, defining a tank interior configured to contain a liquid fuel having at least a flammability rating of 2 under the U.S. Government Hazardous Materials Identification Standards, the tank further configured to comply with U.S. Government requirements for transportation of such liquid fuel over the predetermined roadway;

a pump disposed on the base in fluid communication with at least a portion of the interior of the tank accessible to the liquid fuel and configured to dispense the liquid fuel to supply one or more types of vehicles, a power supply;

an anchor; and an axle assembly coupled to the base proximate the stern and having at least one wheel, the at least one wheel and axle assembly moveable between an engaged position and a stored position, such that when positioned in the engaged position the at least one wheel is in contact with a surface of a roadway and partially supports the base over the surface so that the base may be transported over the predetermined roadway using the at least one wheel, and when positioned in the stored position the base may be rested on the surface.

19. The service station of claim 18, further comprising spud legs that are configured to be used as an anchor if the base were to be used in flooded areas or on waterways.

20. The service station of claim 18, wherein the power supply is a generator, and further comprising:

a water service device, the water service device selected from the group consisting of a water boiler, an oxygenator, an ice maker, and a water desalination device;

an ATM machine;

a ramp adjacent to the pump so that vehicles may refuel due to the freeboard of the base;

a roof; and a telescoping mast satellite antenna and a communications center.

* * * * *